United States Patent
Hsu et al.

(10) Patent No.: US 6,933,699 B2
(45) Date of Patent: Aug. 23, 2005

(54) MOTOR DRIVE CIRCUIT AND METHOD WITH FREQUENCY SETTING AND CORRECTING FUNCTIONS

(75) Inventors: Chia-Chang Hsu, Hsinchu (TW); Yen-John Chen, Changhua (TW)

(73) Assignee: Prolific Technology Inc. (TW)

( * ) Notice: Subject to any disclaimer, the term of this patent is extended or adjusted under 35 U.S.C. 154(b) by 176 days.

(21) Appl. No.: 10/385,604

(22) Filed: Mar. 12, 2003

(65) Prior Publication Data

US 2003/0173927 A1 Sep. 18, 2003

(30) Foreign Application Priority Data

Mar. 12, 2002 (TW) ......................................... 91104641 A

(51) Int. Cl.$^7$ ............................ H02P 5/28; G05B 11/01
(52) U.S. Cl. ...................... 318/635; 318/811; 318/812; 318/822; 318/833
(58) Field of Search ................................ 318/811, 812, 318/822, 823, 635, 799, 809, 599; 388/804, 811, 831, 915; 332/109, 127

(56) References Cited

U.S. PATENT DOCUMENTS

| | | | | |
|---|---|---|---|---|
| 5,300,866 A | * | 4/1994 | Yasohara et al. | ............ 318/254 |
| 5,900,706 A | * | 5/1999 | Hisa | ............................ 318/437 |
| 6,274,993 B1 | * | 8/2001 | Itabashi et al. | ............. 318/432 |
| 6,522,093 B1 | * | 2/2003 | Hsu et al. | .................... 318/254 |
| 6,525,506 B2 | * | 2/2003 | Jin | ............................. 318/801 |
| 6,563,284 B2 | * | 5/2003 | Teutsch et al. | ............. 318/599 |
| 6,617,818 B2 | * | 9/2003 | Hsu et al. | .................... 318/599 |
| 6,737,860 B2 | * | 5/2004 | Hsu et al. | .................... 324/161 |
| 6,810,202 B2 | * | 10/2004 | Hsu et al. | .................... 388/800 |

* cited by examiner

*Primary Examiner*—David Martin
*Assistant Examiner*—Patrick Miller

(57) ABSTRACT

A motor drive circuit and method with frequency setting and correcting functions. The drive circuit includes a speed control device, which simultaneously receives a sense signal and a rotation frequency signal. A pulse width modulation signal capable of modulating a duty ratio may be generated by a pulse width modulation method. The pulse width modulation signal is then transferred to a drive timing controller that generates a timing control signal to control output timing of a power drive signal for the drive circuit. Meanwhile, a sensor is used to detect a motor and to generate a correction sense signal, which is immediately fed back to the speed control device to form a closed loop control, so that the rotation frequency of the motor may be automatically corrected and set.

44 Claims, 9 Drawing Sheets

MOTOR DRIVE CIRCUIT AND METHOD WITH FREQUENCY SETTING AND CORRECTING FUNCTIONS

This application claims the benefit of Taiwan application Ser. No. 091104641, filed Mar. 12, 2002.

BACKGROUND OF THE INVENTION

1. Field of the Invention

The invention relates to a motor drive circuit, and more particularly to a motor drive circuit and method with frequency setting and correcting functions.

2. Description of the Related Art

Products such as notebook computers, scanners, power supplies, and precise electronic instruments are widely used as part of a highly developed information technology industry. In general, it is very important when working with electrical products to quickly dissipate heat in order to obtain maximum efficiency. This is because when heat is concentrated inside the products and cannot be effectively dissipated, individual electrical elements, or even the entire electrical system may experience a failure. A brushless DC motor fan is usually used as a device for dissipating heat so that the electrical elements within the system may operate normally under the optimum temperature environment.

Please refer to FIGS. 1A to 1B, which respectively show a conventional drive circuit for a brushless DC motor and a flow chart for a method of driving the motor. In step 106, a Hall sensor is first used to sense the magnetic field distribution of a rotor magnet 104 and to generate a sense signal. Then, in step 108, a controller 100 is used to receive the sense signal and then generate a non-corrected control signal. In step 110, an actuator 102 amplifies the control signal power and switches the current direction to change the polarity of the coil-induced magnetic field. Finally, in step 112, the magnetic force generated by the coil-induced magnetic field with respect to the rotor magnet 104 is used to drive the rotor magnet 104 to rotate in a specific direction.

Consequently, the conventional method for driving the brushless DC motor is of an open-loop type. That is, the controller can only output a non-corrected control signal in a one-way manner. The non-corrected control signal is then transferred to the actuator 102 in order to drive the motor to rotate. Hence, the motor speed is determined by the driving capability of motor driver and the loading of motor. Driver can not control the motor speed with the conventional driving method. It only depends on the motor mechanical parameter.

Next, when the conventional brushless DC motor is operating, although the motor rotation speed is constant within the primal time period, the motor may lose its optimum standard rotation frequency after a period of time has elapsed. In this case, the motor rotation speed may wander, resulting in undesired phenomena (e.g., unstable gas quantity, loud motor noise, and vibration), and the system operation may be negatively influenced.

The conventional brushless DC motor may have inherent structural defects from the manufacturing processes, such as mechanical assembly errors, coil shape variations, washer deformations, and poor bearing lubrication. Therefore, a single batch of motors may have individual units with different standard rotation speeds, thus manufacturing costs will increase if a high percentage of the products cannot meet the standard requirements and have to be eliminated.

Brushless DC motors in computer systems operate at a precise standard rotation frequency by using the computer to perform rotation frequency detection and then correcting the rotation frequency according to the detected rotation frequency. In other words, the brushless DC motor itself does not have the capability of direct detection and correction. Furthermore, the loading of the computer system is inevitably increased if the computer system has to frequently detect the motor rotation frequency in order to maintain the ideal motor rotation speed.

Consequently, the standard rotation frequency of a conventional brushless DC motor may wander and vary during the operation causing the system to operate abnormally. Moreover, structural errors due to the manufacturing processes may even deviate the real rotation speed from the standard rotation speed.

SUMMARY OF THE INVENTION

In view of the above-mentioned problems in the manufacturing processes and usage of the conventional brushless DC motor, a primary objective of the invention is to utilize a motor drive circuit to keep the motor rotation frequency constant, and thus to solve the problem of rotation frequency wandering during periods of extended use.

A secondary objective of the invention is to utilize a motor drive circuit in conjunction with a frequency generator to form a drive circuit with the function of setting the rotation frequency so that the manufacturer may easily manufacture a batch of motors with the same rotation frequency and facilitate quality management flow. Most importantly, various motors with different standard rotation speeds may be manufactured by setting the parameters for adjusting the frequency generator under the same condition and with the same number of coil loops. Therefore, the process of winding the wire into coil loops may be greatly simplified.

According to the above-mentioned objectives, the invention discloses a motor drive circuit and method with frequency setting and correction functions. The motor drive circuit includes:

a speed control device simultaneously receiving a sense signal and a rotation speed signal through the sense-signal input terminal and the rotation-speed-signal input terminal, respectively, to generate a phase difference signal and to generate, in a pulse width modulation manner, a pulse width modulation signal capable of modulating a duty ratio, wherein the pulse width modulation signal corresponds to the phase difference signal between the sense signal and the rotation speed signal, and immediately corresponds to a real rotation frequency of the motor;

a drive device having a first power output terminal, a second power output terminal and a signal input terminal, wherein the first power output terminal and the second power output terminal are coupled to the motor coil, respectively, the drive device includes a plurality of transistors to generate a power drive signal, utilizes a sensor to generate a correction sense signal, and immediately feeds the correction sense signal back to the speed control device to form a closed-loop control so as to automatically correct the rotation frequency of the motor; and a drive timing controller coupled to the modulation signal output terminal of the speed control device and the signal input terminal of the drive device, the drive timing controller receiving the pulse width modulation signal and utilizing a plurality of switch elements to generate a timing control signal so as to control output timing of the power drive signal and prevent the short circuit of the driver device.

In addition, the drive circuit may further comprise:

a lock-up detection circuit connected to the drive timing controller, the lock-up detection circuit detecting a lock-up state of a rotor of the motor, wherein when the rotor is locked, the motor stops rotating to reduce power consumption;

a lock-up timing controller connected to the lock-up detection circuit, the lock-up timing controller modulating the lock-up detection circuit and intermittently starting the motor by adjusting the power drive signal; and a frequency processing device coupled to the sense-signal input terminal and the lock-up detection circuit, the frequency processing device receiving the sense signal and converting the frequency of the sense signal.

During the operation, a sense signal and a rotation speed signal are first input, wherein the sense signal is generated from a sensor. Then, a speed control device is utilized to simultaneously receive the sense signal and the rotation speed signal in order to generate a phase difference signal and to generate a pulse width modulation signal capable of modulating the duty ratio in a pulse width modulation manner. A drive device is used to generate a power drive signal in order to automatically correct or set the rotation frequency of the motor, wherein a drive timing controller is used to receive the pulse width modulation signal, and a timing control signal is generated to control output timing of the power drive signal. Finally, the sensor is utilized to detect the real rotation frequency of the motor immediately, and then to generate a correction sense signal, wherein the correction sense signal is immediately fed back to the speed control device to form the closed loop control.

In summary, the invention discloses a motor drive circuit and method with frequency setting and correcting functions, wherein a rotation frequency setting signal is generated to set and correct the real rotation frequency of the motor. Thus, it is possible to compensate for the structure errors that occur during the manufacturing processes and to compensate for errors due to wandering rotation frequencies of the motors during periods of extended operation. Consequently, the invention may effectively increase the manufacturing yield of the motors, ensure that the motors will rotate under constant rotation speeds, prevent rotation frequency wandering of the motors, avoid noise and vibration, and thus maintain stable system operations.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a complete solution to solving the drawbacks of the prior art. The motor drive circuit and method with frequency setting and correcting functions will be described with reference to the accompanying drawings. The motor drive circuit of the invention is mainly applied to a brushless DC motor and is also suitable for controlling motors with various pole numbers of, for example, four, six, eight, twelve, or higher. In general, the pole number is in direct proportion to the output horsepower of the motor. That is, the greater the pole number, the larger the output horsepower. More specifically, the motor drive circuit may be applied to a brushless DC motor with single or double coils.

Figure 1A:
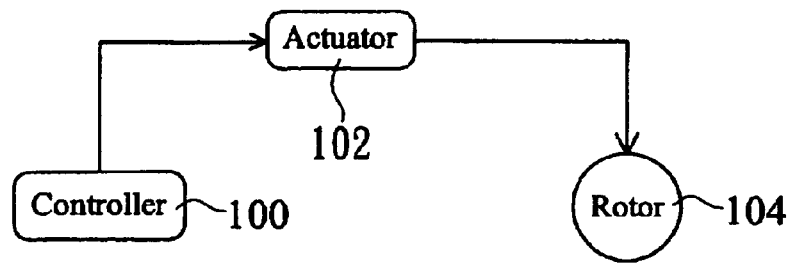
FIG. 1A is a block diagram showing a prior art drive circuit for a brushless DC motor.
Figure 1B:
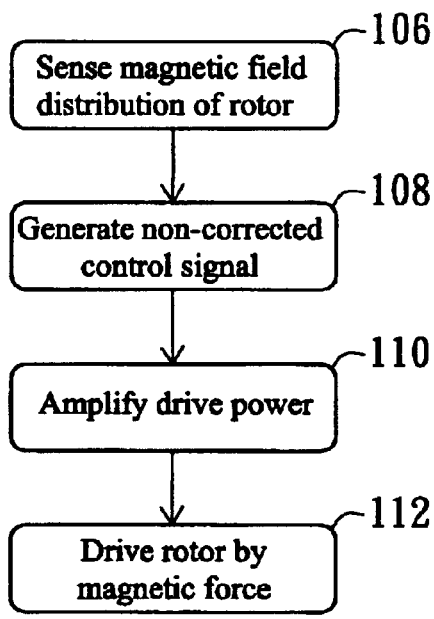
FIG. 1B is a flow chart showing a prior art drive method for driving a brushless DC motor.
Figure 2A:
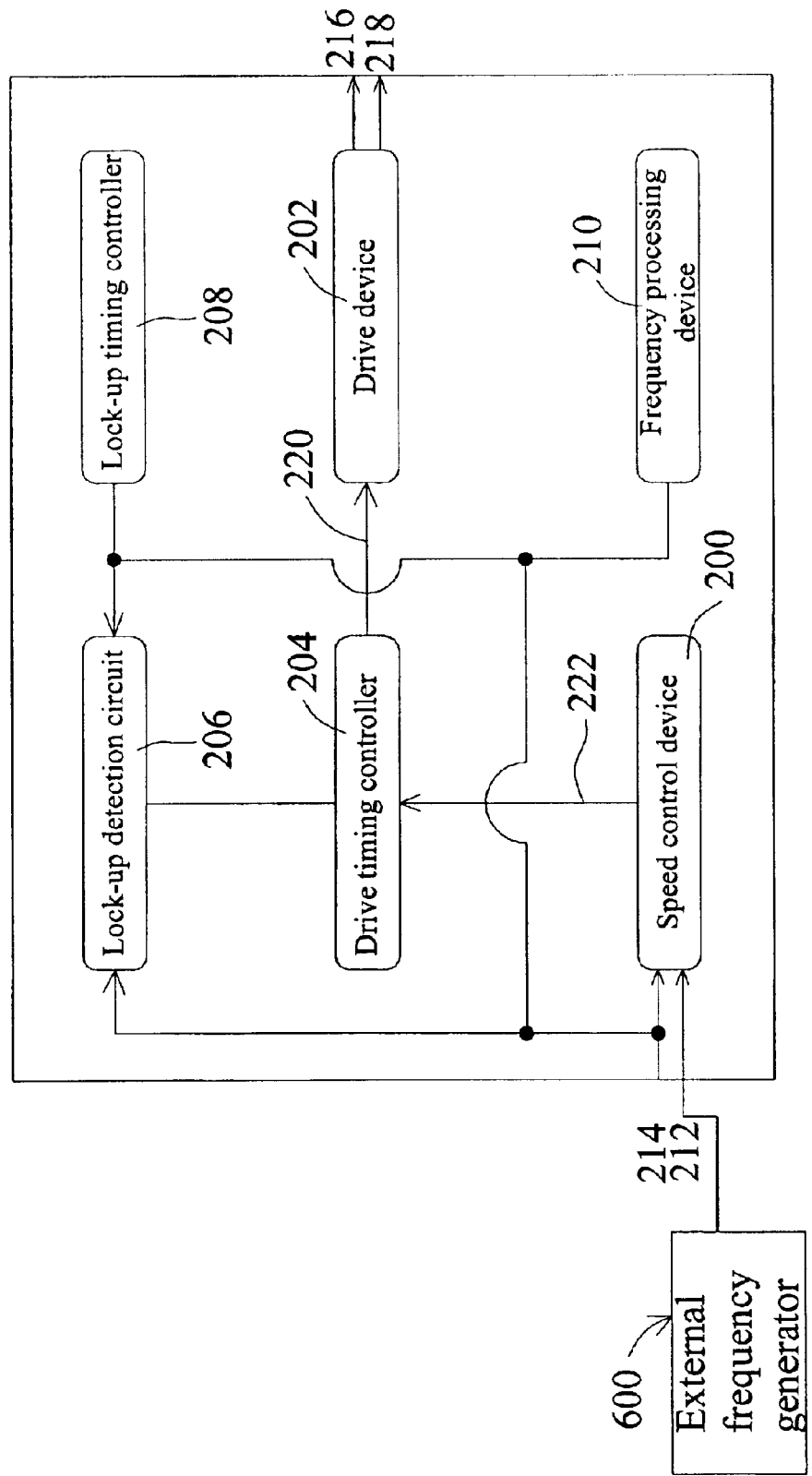
FIG. 2A is a block diagram showing a motor drive circuit of the invention.

FIG. 2A is a block diagram showing a motor drive circuit of the invention. The motor drive circuit includes a speed control device 200, a drive device 202, a drive timing controller 204, a lock-up detection circuit 206, a lock-up timing controller 208, and a frequency processing device 210. The speed control device 200 has a sense-signal input terminal 214, a rotation-speed-signal input terminal 212, and a pulse-width-modulation-signal output terminal 222. A sense signal Hin and a rotation speed signal SC are respectively input from the sense-signal input terminal 214 and the rotation-speed-signal input terminal 212 to form a phase difference signal. Then, a pulse width modulation signal PWM that may modulate a duty ratio is formed in a pulse width modulation manner. The pulse width modulation signal corresponds to the phase difference signal between the sense signal and the rotation speed signal, and the pulse width modulation signal may correspond to the real-time rotation frequency of the motor.

Figure 3A:
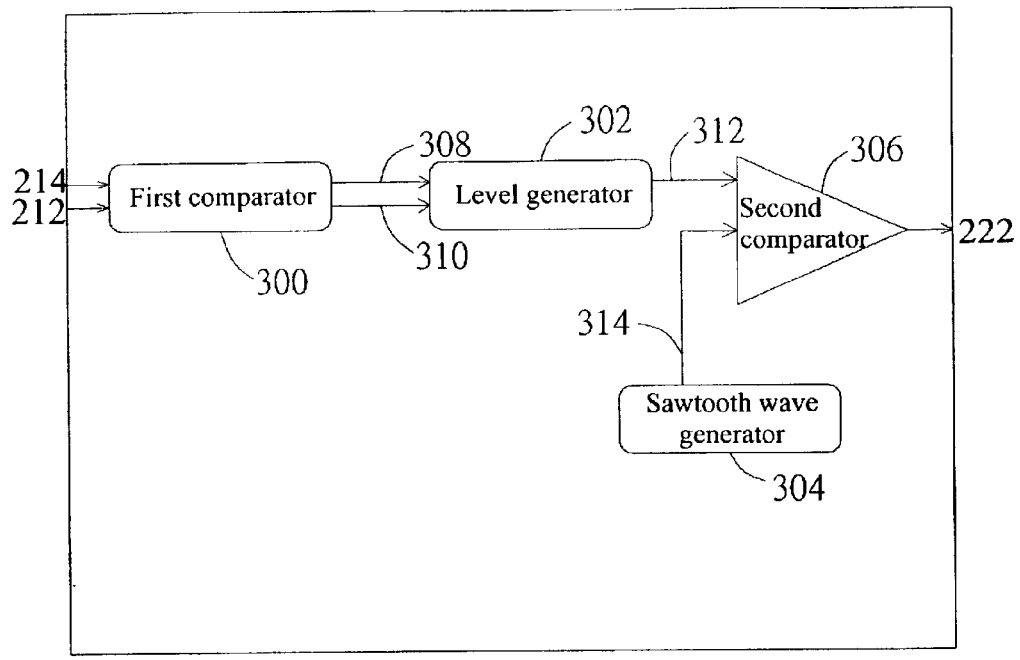
FIG. 3A shows a speed control device of the invention.
Figure 3B:
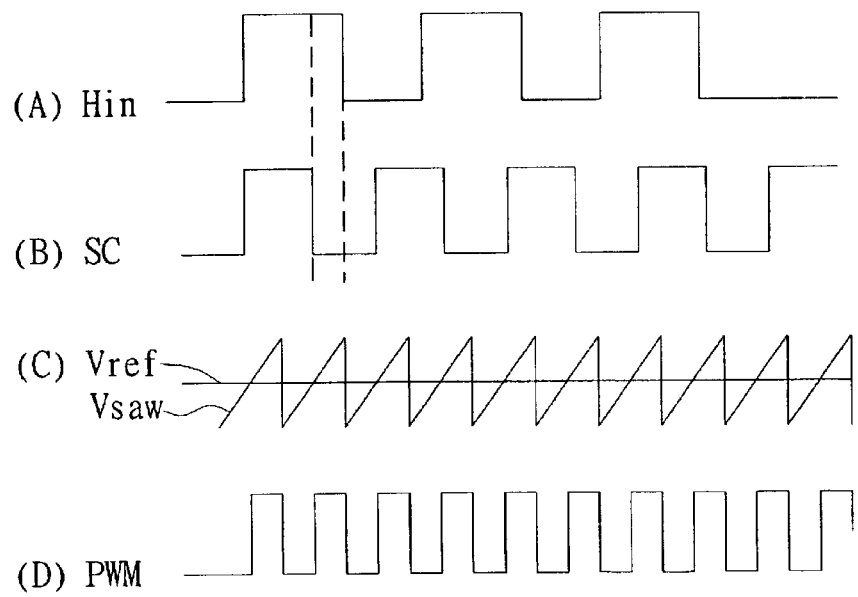
FIG. 3B shows a timing diagram for the speed control device of the invention.

Please refer to FIGS. 3A and 3B, which show the speed control device of the invention and its timing diagram. In the preferred embodiment of the invention the speed control device 200 includes a first comparator 300, a level generator 302, a sawtooth wave generator 304, and a second comparator 306. In the timing diagram of the speed control device 200, (A) denotes the output waveform of the sense signal Hin and the real rotation speed of the motor; (B) denotes the output waveform of the rotation speed signal SC and the standard rotation speed of the motor or rotation frequency configuration; (C) denotes output waveforms of the sawtooth wave signal Vsaw and level signal Vref; and (D) denotes the output waveform of the pulse width modulation signal PWM corresponding to the phase difference between the sense signal and the rotation speed signal.

More specifically, the first comparator 300 has the sense-signal input terminal 214, the rotation-speed-signal input terminal 212, a first output terminal 308, and a second output terminal 310. The sense and rotation speed signals, respectively, are input to the first comparator 300 through the sense-signal input terminal 214 and the rotation-speed-signal input terminal 212, and then the first comparator 300 forms the phase difference signal. The sense signal corresponds to the real rotation frequency of the motor, the rotation speed signal corresponds to the standard rotation frequency or an external frequency of the motor, and a sensor (not shown) is mounted inside the motor or to a circuit board outside the motor. In addition, the sensor may be a Hall sensor or other magnetic field sensor, and the first comparator 300 may be an OR gate, NOR gate, AND gate, NAND gate, phase-locked loop (PLL) circuit, counter, or any combinations thereof.

Figure 3C:
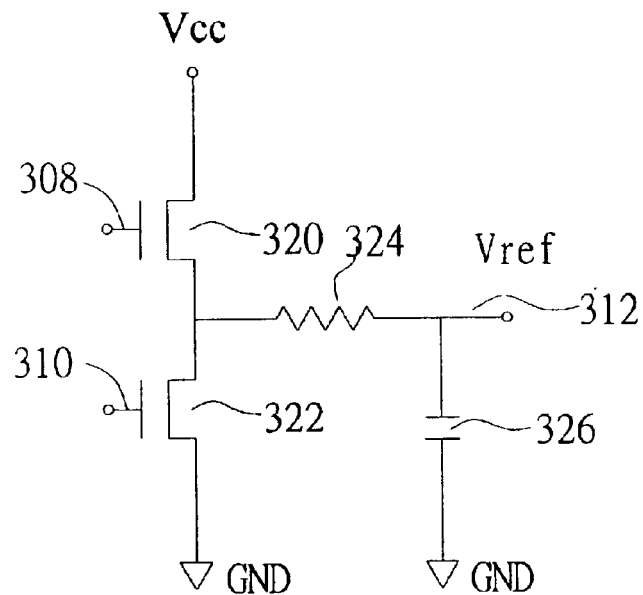
FIG. 3C is a circuit diagram showing a level generator of the invention.

FIG. 3C is a circuit diagram showing a level generator of the invention. In the preferred embodiment, the level generator 302 includes a first transistor 320, a second transistor 322, a resistor 324, and a capacitor 326. The first transistor 320 has a drain, a source connected to a supply voltage, and a gate connected to the first output terminal 308. The second transistor 322 has a source connected to the drain of the first transistor, a drain that is grounded, and a gate connected to the second output terminal 310. The resistor 324 has a first terminal connected to the drain of the first transistor, and a second terminal that is a level output terminal 312, on which a level signal is formed according to the phase difference signal. The capacitor 326 has a first terminal connected to the level output terminal 312, and a second terminal that is grounded. The first transistor 320, and the second transistor 322 may each be, for example, a field effect transistor or a bi-polar junction transistor.

Figure 3D:
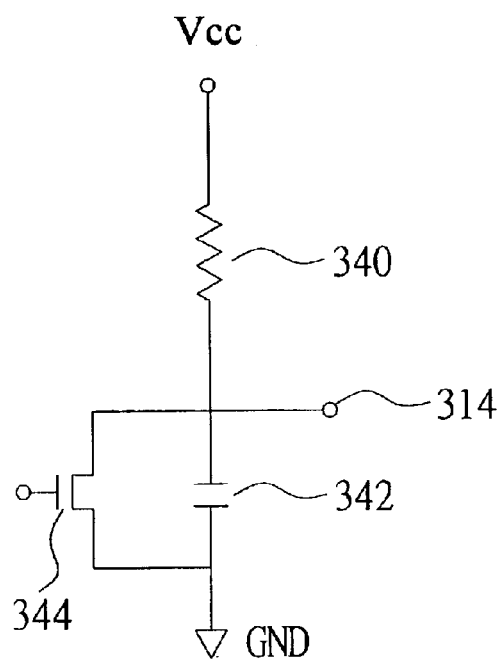
FIG. 3D is a circuit diagram showing a sawtooth wave generator of the invention.

FIG. 3D is a circuit diagram showing a sawtooth wave generator of the invention. In the preferred embodiment of the invention, the sawtooth wave generator includes a resistor 340, a capacitor 342, and a transistor 344. The resistor 340 has a first terminal coupled to the supply voltage Vcc, and a second terminal coupled to a sawtooth wave output terminal 314. The capacitor 342 has a first terminal coupled to the sawtooth wave output terminal 314, and a second terminal coupled to the ground GND. Transistor 344 has a control terminal and is connected between the sawtooth wave output terminal 314, and the ground.

Please refer to FIG. 3A. The second comparator 306 has a level input terminal 312, a reference input terminal 314, and the pulse-width-modulation-signal output terminal 222. The level input terminal 312 and the reference input terminal 314 are connected to the level output terminal 312 and the sawtooth wave output terminal 314, respectively. The second comparator 306 simultaneously receives a sawtooth wave signal and a level signal, and modulates the sawtooth wave signal on the basis of the level signal in a pulse width modulation manner so as to form a pulse width modulation signal capable of modulating the duty ratio.

Figure 4A:
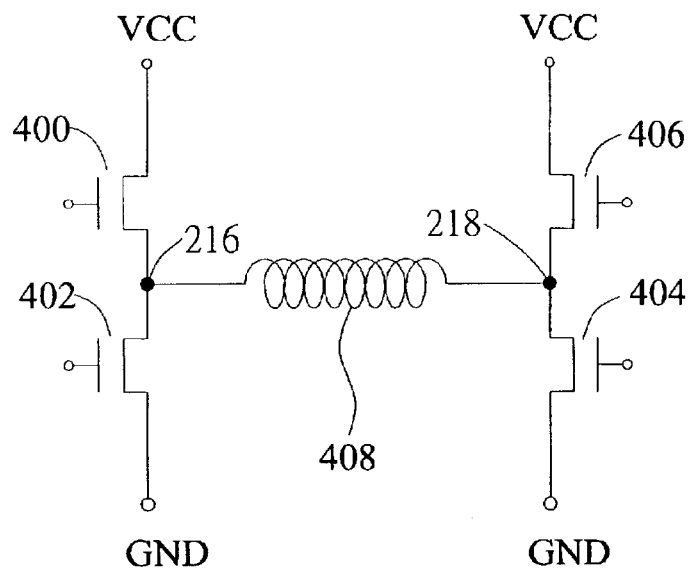
FIGS. 4A to 4C show a drive circuit according to a first embodiment of the invention.
Figure 4B:
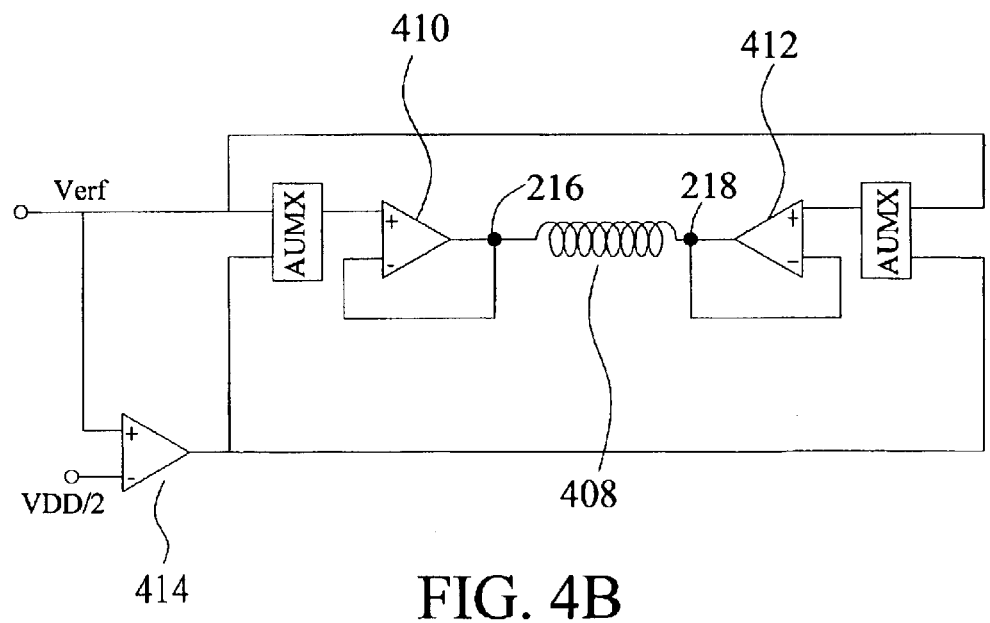
Figure 4C:
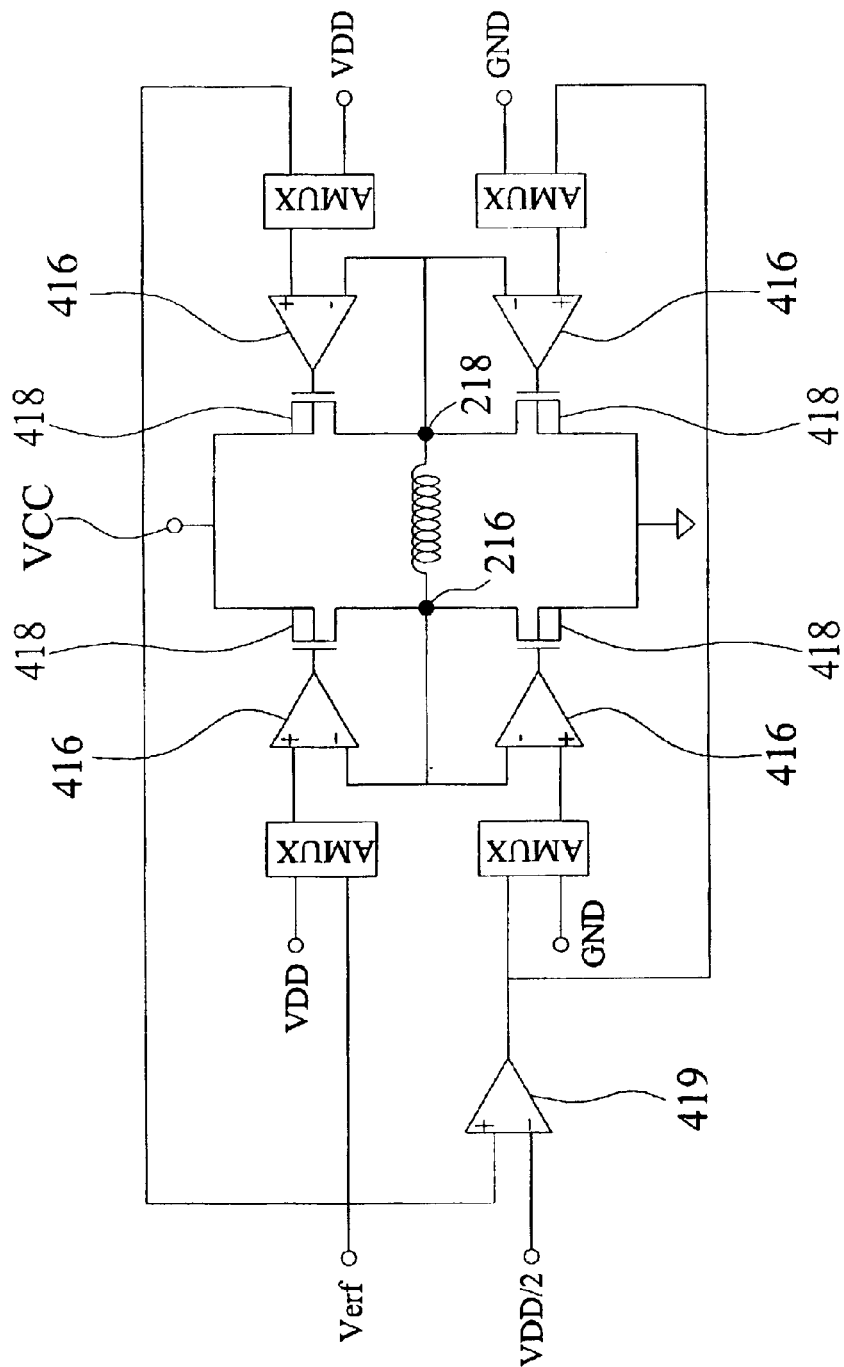

FIGS. 4A to 4C show a drive circuit according to a first embodiment of the invention. The drive device 202 of FIG. 2A has a first power output terminal 216, a second power output terminal 218, and a signal input terminal 220. The first power output terminal 216 and the second power output terminal 218 are coupled to the motor coil, and the signal input terminal 220 is coupled to the drive timing controller 204. The drive device 202 has multiple transistors to generate a power drive signal, and utilizes the sensor to sense the corrected rotation speed, which immediately feeds the correction sense signal back to the speed control device 200. Therefore, a closed loop control is constructed to automatically correct the rotation frequency of the motor.

In an embodiment of the invention, as shown in FIG. 4A, a single coil 408, which has first and second terminals, is shown. The drive device 202 includes a first transistor 400, a second transistor 402, a third transistor 404, and a fourth transistor 406, each of which has a source, a gate, and a drain. In the first transistor 400, its source is connected to power supply end VCC, its drain is the first power output terminal 216 and is connected to the first terminal of the single coil 408, and its gate is connected to the drive timing controller 204. In the second transistor 402, its source is coupled to ground end GND, its drain is the second power output terminal 216 and is couple to the first terminal of the single coil 408, and its gate is connected to the drive timing controller. The main feature resides in that the first transistor 400 and the second transistor 402 are not turned on simultaneously.

Next, in the third transistor 404, its source is connected to the ground end GND, its drain is the second power output terminal 218 and is coupled to the second end of the single coil 408, and its gate is coupled to the drive timing controller 204. In the fourth transistor 406, its source is connected to the power supply end VCC, its drain is the second power output terminal 218 and is coupled to the second terminal of the single coil, and its gate is connected to the drive timing controller 204. The main feature resides in that the third transistor 404 and the fourth transistor 406 are not turned on simultaneously.

In another embodiment of the invention, as shown in FIG. 4B, the motor has a single coil 408, which has first and second terminals connected to the first power output terminal 216 and the second power output terminal 218 respectively. The drive device 202 includes a first comparator 410, a second comparator 412, and a phase inverter 414, each of which has two input terminals and an output terminal, wherein the voltage of the negative input terminal of the phase inverter 414 is VDD/2, and the positive input terminal is coupled to the level signal Vref. The power voltage in this embodiment is a constant value and this embodiment consumes less power.

In another embodiment of the invention, as shown in FIG. 4C, the motor has a single coil 408, which has a first terminal and a second terminal connected to the first power output terminal 216 and the second power output terminal 218 respectively. The drive device 202 includes four transistors 418, each of which has a source, a gate, and a drain. The first and second terminals of coil 408 are connected to negative input terminals of four comparators 416 for feedback.

Figure 4D:
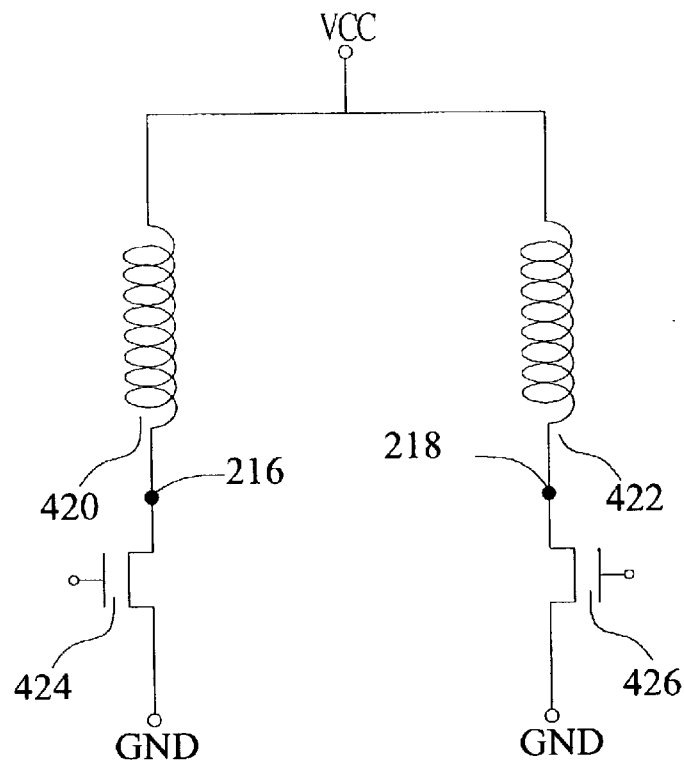
FIGS. 4D to 4E show a drive device according to a second embodiment of the invention.

FIG. 4D shows a drive device according to a second embodiment of the invention. The motor has a first coil 420 and a second coil 422, each of which has a first terminal connected to the power supply end VCC. And the second terminals of the first coil 420 and the second coil 422 are coupled to the first power output terminal 216 and the second power output terminal 218. The drive device 202 includes a first transistor 424 and a second transistor 426, each of which has a source, a gate, and a drain. In the first transistor 424, its source is connected to the ground end GND, its drain is the second power output terminal 218 and is connect to the second terminal of the first coil 420, and its gate is connected to the drive timing controller 204. In the second transistor 426, its source is connected to the ground end GND, its drain is the second power output terminal 218 and is coupled to the second terminal of the second coil 422, and its gate is connected to the drive timing controller 204.

Figure 4E:
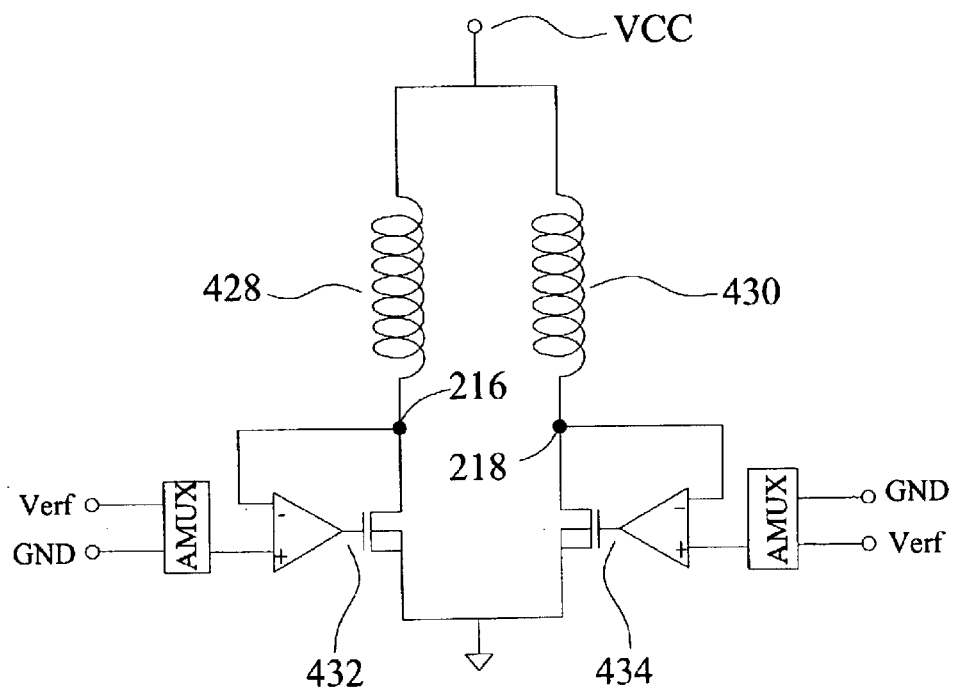

In the embodiment of the invention shown in FIG. 4E, the motor has a first coil 428 and a second coil 430, wherein each of which has a first terminal connected to the power supply end VCC. The drive device 202 includes a first transistor 432 and a second transistor 434, each of which has a source, a gate, and a drain. In this embodiment, the voltage for driving the motor may change with the loading variation. Thus, the rotor may rotate more smoothly when the pole number of the motor is switched, and motor vibration may be avoided.

FIG. 2A shows the drive timing controller 204, which is coupled to the pulse-width-modulation-signal output terminal 222 of the speed control device 200 and the drive device 202. During the operation, the drive timing controller 204 receives the pulse width modulation signal, and utilizes multiple switch elements to generate a timing control signal in order to control the output timing of the power drive signal and prevent the short circuit of the driver device.

Figure 5:
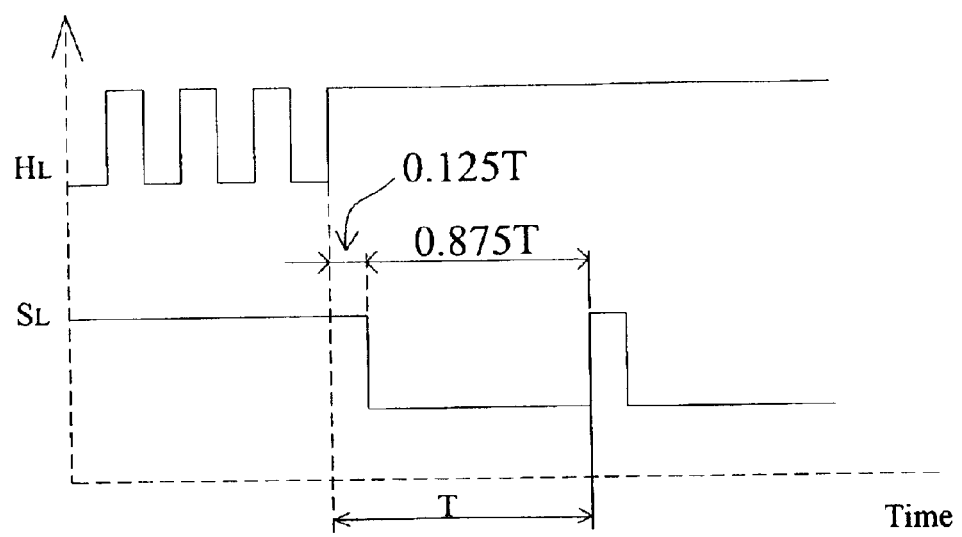
FIG. 5 shows a lock-up timing controller of the invention.

FIG. 5 shows a timing diagram of a lock-up timing controller of the invention. The lock-up detection circuit 206 is connected to the drive timing controller 204 and is used to detect the lock-up state of the motor rotor when an external force is applied to the rotor. When the rotor is locked, the lock-up detection circuit 206 generates a lock-up sense signal $H_L$, and the motor may stop rotating to decrease power consumption. The drive timing controller 204 is connected to the lock-up detection circuit 206 to modulate the lock-up detection circuit 206 and generate a power drive signal $S_L$ to start the motor intermittently by adjusting the duty ratio. The preferable ratio of (start period/stop period) is about (0.125T/0.875T).

The frequency processing device 210 is coupled to the sense-signal input terminal 214 and the lock-up detection circuit 206. The frequency processing device 210 receives the sense signal and converts the frequency according to the sense signal. In practical applications, owing to the difference between the pole numbers of the motor, the received sense signal has to be divided by a number (e.g., 1, 1.5, 2, 2.5, 3 and 3.5) so as to match up with the motor rotation frequency. In addition, when the motor stops rotating, the frequency processing device 210 will output a high level signal to show the stationary state of the motor.

Figure 6:
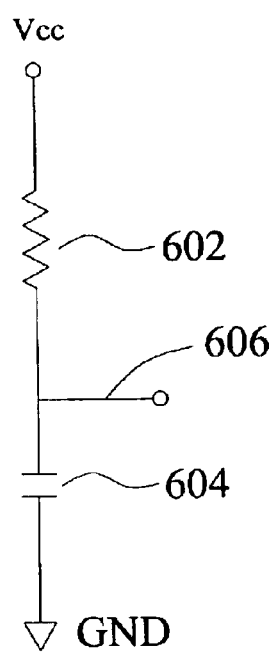
FIG. 6 shows an embodiment of the invention, which automatically sets the rotation frequency of the motor drive circuit.

FIG. 6 shows an embodiment of the invention which automatically sets the rotation frequency of the motor drive circuit. A rotation frequency setting signal for the motor may be provided from an external frequency generator 600. For example, an RC peripheral circuit composed of a resistor and a capacitor may be utilized to generate a stable frequency to set the rotation frequency. In the preferred embodiment of the invention, the frequency generator 600 is utilized in conjunction with an oscillator (not shown) to generate a rotation frequency setting signal. The frequency generator 600 includes a resistor 602 and a capacitor 604, wherein a first terminal of the resistor 602 is connected to the supply voltage and a second terminal of the resistor 602 is connected to a first terminal of the capacitor 604. The second terminal of the resistor 602 is an output terminal 606 for outputting the rotation frequency setting signal, and a second terminal of the capacitor 604 is grounded.

When motors having different standard rotation speeds are to be manufactured, stator coils having the same structure in the number of coil loops may be utilized. Using the frequency generator 600 to set the standard rotation speeds, it is possible to manufacture motors having the same number of coil loops but different standard rotation speeds. Because no additional parameter is needed to manufacture motors having the same number of coil loops, the process of manufacturing motors may be effectively simplified.

Figure 2B:
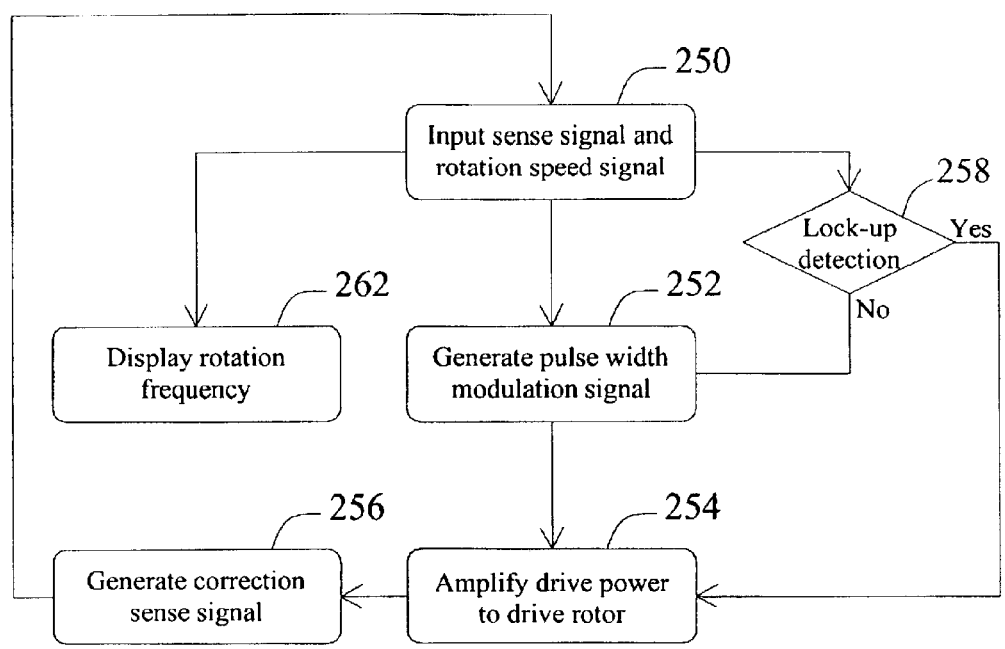
FIG. 2B is a flow chart showing a method applied to the motor drive circuit of the invention.

Please refer to FIG. 2B, which is a flow chart showing a method applied to the motor drive circuit of the invention. During step 250 of the operation, a sense signal and a rotation speed signal are first input, wherein the sense signal is generated from a sensor. Then, in step 252, a speed control device is utilized to simultaneously receive the sense signal and the rotation speed signal and to generate a phase difference signal and a pulse width modulation signal capable of modulating the duty ratio in a pulse width modulation manner. In step 254, a drive device is used to generate a power drive signal in order to automatically correct the rotation frequency of the motor, wherein a drive timing controller is used to receive the pulse width modulation signal and a timing control signal is generated to control the output timing of the power drive signal. Finally, in step 256, the sensor is utilized to detect the real rotation frequency of the motor, and a correction sense signal is generated immediately, wherein the correction sense signal is immediately fed back to the speed control device to form the closed loop control.

In step 258, a lock-up timing controller is used to control the lock-up detection circuit. If the motor is rotating, step 252 is directly performed. If the motor is in a lock-up state, the lock-up timing controller is utilized to generate a timing control signal, and then the motor is intermittently started by performing step 254, decreasing power consumption. In step 256, a frequency processing device is utilized to receive the sense signal and to perform a frequency conversion step.

In summary, the invention discloses a motor drive circuit and method with frequency setting and correcting functions, wherein a rotation frequency setting signal is generated to set and correct the real rotation frequency of the motor. Thus, it is possible to compensate for structural errors that occur during the manufacturing of the motor and the wandering errors in the rotation frequency of the motors after the motors are used for an extended period of time. Consequently, the invention may effectively increase the manufacturing yield of the motor, ensure that the motor may rotate under a constant rotation speed, prevent the rotation frequency of the motor from wandering, avoid noise and vibration, and thus maintain stable system operations.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A motor drive circuit that automatically corrects a rotation frequency of a motor, the drive circuit comprising:
    a speed control device having a sense-signal input terminal, a rotation-speed-signal input terminal, and a modulation signal output terminal, the speed control device simultaneously receiving a sense signal and a rotation speed signal through the sense-signal input terminal and the rotation-speed-signal input terminal, respectively, to generate a phase difference signal between the sense signal and the rotation speed signal and to generate, in a pulse width modulation manner, a pulse width modulation signal capable of modulating a duty ratio, wherein the pulse width modulation signal corresponds to the phase difference signal a real rotation frequency of the motor;
    a drive device having a first power output terminal, a second power output terminal and a signal input terminal, wherein the first power output terminal and the second power output terminal are coupled to the motor coil, respectively, and the drive device includes a plurality of transistors to generate a power drive signal, utilizes a sensor to generate a correction sense signal, and immediately feeds the correction sense signal back to the speed control device to form a closed loop control so as to automatically correct the rotation frequency of the motor;

a drive timing controller coupled to the modulation signal output terminal of the speed control device and the signal input terminal of the drive device, the drive timing controller receiving the pulse width modulation signal and utilizing multiple switch elements to generate a timing control signal so as to control output timing of the power drive signal and prevent the short circuit of the driver device;

a lock-up detection circuit connected to the drive timing controller, the lock-up detection circuit detecting a lock-up state of a rotor of the motor, wherein when the rotor is locked, the motor stops rotating to reduce power consumption; and a lock-up timing controller connected to the lock-up detection circuit, the lock-up timing controller modulating the lock-up detection circuit and intermittently starting the motor by adjusting the power drive signal.

2. The motor drive circuit according to claim 1, wherein the speed control device comprises:

a first comparator having the sense-signal input terminal, the rotation-speed-signal input terminal, a first output terminal and a second output terminal, the first comparator simultaneously receiving the sense signal and the rotation speed signal through the sense-signal input terminal and the rotation-speed-signal input terminal, respectively, to generate the phase difference signal, wherein the sense signal corresponds to the real rotation frequency of the motor, the rotation speed signal corresponds to a standard rotation frequency of the motor, the sensor is utilized to obtain the sense signal, and the sensor is mounted inside or outside the motor;

a level generator having a first input terminal, a second input terminal and a level output terminal, wherein the first input terminal and the second input terminal are coupled to the first output terminal and the second output terminal, respectively, and the level generator selectively receives and processes the phase difference signal to generate a level signal;

a sawtooth wave generator having a sawtooth wave output terminal for generating a sawtooth wave signal; and a second comparator having a level input terminal, a reference input terminal, and the modulation signal output terminal, wherein the level input terminal and the reference input terminal are connected to the level output terminal and the sawtooth wave output terminal, respectively, and the second comparator simultaneously receives the sawtooth wave signal and the level signal, and modulates, in the pulse width modulation manner, the sawtooth wave signal on a basis of the level signal so as to form the pulse width modulation signal capable of modulating the duty ratio.

3. The motor drive circuit according to claim 2, wherein the first comparator is selected from a group consisting of an OR gate logic operator, a NOR gate logic operator, an AND gate logic operator, a NAND gate logic operator and any combinations of the logic operators.

4. The motor drive circuit according to claim 2, wherein the first comparator is a phase-locked loop (PLL) circuit.

5. The motor drive circuit according to claim 2, wherein the first comparator is a counter.

6. The motor drive circuit according to claim 2, wherein the sensor comprises a Hall sensor or magnetic resistor.

7. The motor drive circuit according to claim 2, wherein the level generator comprises:

a first transistor having a first source, a first gate and a first drain, the first source being connected to a supply voltage and the first gate being connected to the first output terminal;

a second transistor having a second source, a second gate and a second drain, the second source being connected to the first drain, the second drain being grounded, and the second gate being connected to the second output terminal;

a resistor having a first terminal and a second terminal, the first terminal being connected to the first drain and the second terminal being the level output terminal to generate the level signal by utilizing the phase difference signal; and a capacitor having a first terminal and a second terminal, the first terminal being connected to the level output terminal and the second terminal being grounded.

8. The motor drive circuit according to claim 7, wherein the first transistor is one of a field effect transistor and a bi-polar junction transistor.

9. The motor drive circuit according to claim 7, wherein the second transistor is one of a field effect transistor and a bi-polar junction transistor.

10. The motor drive circuit according to claim 2, wherein the sawtooth wave generator comprises:

a resistor having a first terminal and a second terminal, the first terminal being coupled to the supply voltage and the second terminal being connected to the sawtooth wave output terminal;

a capacitor having a third terminal and a fourth terminal, the third terminal being coupled to the sawtooth wave output terminal and the fourth terminal being grounded; and a transistor coupled between the sawtooth wave output terminal and a ground, and having a control terminal.

11. The motor drive circuit according to claim 1, wherein the motor includes a single coil, which has a first terminal and a second terminal, and the drive device comprises:

a first transistor having a first source, a first gate and a first drain, the first source being connected to a power supply end, the first drain being the first power output terminal and coupled to the first terminal of the single coil, and the first gate being connected to the drive timing controller;

a second transistor having a second source a second gate and a second drain, the second source being coupled to a ground end, the second drain being the second power output terminal and coupled to the first terminal of the single coil, and the second gate being connected to the drive timing controller, wherein the first transistor and the second transistor are not turned on simultaneously;

a third transistor having a third source, a third gate and a third drain, the third source being coupled to the ground end, the third drain being the second power output terminal and coupled to the second terminal of the single coil, and the third gate being connected to the drive timing controller; and a fourth transistor having a fourth source, a fourth gate and a fourth drain, the fourth source being connected to the power supply end VCC, the fourth drain being the second power output terminal and coupled to the second terminal of the single coil, and the fourth gate being connected to the drive timing controller, wherein the third transistor and the fourth transistor are not turned on simultaneously.

12. The motor drive circuit according to claim 1, wherein the motor includes a first coil and a second coil, each of which having a first terminal and a second terminal, the first terminals of the first coil and the second coil are simultaneously coupled to the power supply end, and the drive device comprises:

a first transistor having a first source, a first gate and a first drain, the first source being connected to the ground end, the first drain being the first power output terminal and coupled to the second terminal of the first coil, and the first gate being connected to the drive timing controller; and a second transistor having a second source, a second gate and a second drain, the second source being connected to the ground end, the second drain being the second power output terminal and coupled to the second terminal of the second coil, and the second gate being connected to the drive timing controller.

13. The motor drive circuit according to claim 1, further comprising a frequency generator for generating a rotation frequency setting signal in conjunction with an oscillator, the frequency generator comprising:

a resistor having a first terminal and a second terminal, the first terminal being connected to the supply voltage and the rotation frequency setting signal being output from the second terminal; and a capacitor having a third terminal and a fourth terminal, the third terminal being connected to the second terminal, and the fourth terminal being grounded.

14. The motor drive circuit according to claim 1, further comprising a frequency processing device coupled to the sense-signal input terminal and the lock-up detection circuit, the frequency processing device receiving the sense signal and converting the frequency of the sense signal.

15. A motor drive circuit capable of automatically correcting a rotation frequency of a motor, the drive circuit comprising:

a speed control device having a sense-signal input terminal, a rotation-speed-signal input terminal and a modulation signal output terminal, the speed control device simultaneously receiving a sense signal and a rotation speed signal the sense-signal input terminal and the rotation-speed-signal input terminal, respectively, to generate a phase difference signal and to generate, in a pulse width modulation manner, a pulse width modulation signal capable of modulating a duty ratio wherein the pulse width modulation signal corresponds to the phase difference signal between the sense signal and the rotation speed signal, and the pulse width modulation signal corresponds to a real rotation frequency of the motor immediately, the speed control device comprising:

a first comparator having the sense-signal input terminal the rotation-speed-signal input terminal, a first output terminal and a second output terminal, the first comparator simultaneously receiving the sense signal and the rotation speed signal through the sense-signal input terminal and the rotation-speed signal input terminal, respectively, to generate the phase difference signal, wherein the sense signal corresponds to the real rotation frequency of the motor, the rotation speed signal corresponds to a standard rotation frequency of the motor, the sensor is utilized to obtain the sense signal, and the sensor is mounted inside or outside the motor;

a level generator having a first input terminal, a second input terminal and a level output terminal, wherein the first input terminal and the second input terminal are coupled to the first output terminal and the second output terminal, respectively, and the level generator selectively receives and processes the phase difference signal to generate a level signal;

a sawtooth wave generator having a sawtooth wave output terminal for generating a sawtooth wave signal; and a second comparator having a first input terminal, a second input terminal and the modulation signal output terminal, wherein the first input terminal and the second input terminal are connected to the sawtooth wave output terminal and the level output terminal, respectively, and the second comparator simultaneously receives the sawtooth wave signal and the level signal, and modulates, in the pulse width modulation manner, the sawtooth wave signal on a basis of the level signal so as to form the pulse width modulation signal capable of modulating the duty ratio;

a drive device having a first power output terminal, a second power output terminal and a signal input terminal, wherein the first power output terminal and the second power output terminal are coupled to motor coils, respectively, and the drive device includes a plurality of transistors to generate a power drive signal, utilizes a sensor to generate a correction sense signal, and immediately feeds the correction sense signal back to the speed control device to form a closed loop control so as to automatically correct the rotation frequency of the motor; and a drive timing controller coupled to the modulation signal output terminal of the speed control device and the signal input terminal, the drive timing controller receiving the pulse width modulation signal and utilizing a plurality of switch elements to generate a timing control signal so as to control output timing of the power drive signal and prevent the short circuit of the driver device.

16. The motor drive circuit according to claim 15, wherein the first comparator is selected from a group consisting of an OR gate logic operator, a NOR gate logic operator, an AND gate logic operator, a NAND gate logic operator and any combinations of the logic operators.

17. The motor drive circuit according to claim 15, wherein the first comparator is a phase-locked loop (PLL) circuit.

18. The motor drive circuit according to claim 15, wherein the first comparator is a counter.

19. The motor drive circuit according to claim 15, wherein the sensor comprises a Hall sensor or magnetic resistor.

20. The motor drive circuit according to claim 15, wherein the level generator comprises:

a first transistor having a first source, a first gate and a first drain, the first source being connected to a supply voltage and the first gate being connected to the first output terminal;

a second transistor having a second source, a second gate and a second drain, the second source being connected to the first drain, the second drain being grounded, and the second gate being connected to the second output terminal;

a resistor having a first terminal and a second terminal, the first terminal being connected to the first drain and the second terminal being the level output terminal to generate the level signal by utilizing the phase difference signal; and a capacitor having a first terminal and a second terminal, the first terminal being connected to the level output terminal and the second terminal being grounded.

21. The motor drive circuit according to claim 20, wherein the first transistor is one of a field effect transistor and a bi-polar junction transistor.

22. The motor drive circuit according to claim 20, wherein the second transistor is one of a field effect transistor and a bi-polar junction transistor.

23. The motor drive circuit according to claim 15, wherein the sawtooth wave generator comprises:
- a resistor having a first terminal and a second terminal, the first terminal being coupled to the supply voltage and the second terminal being connected to the sawtooth wave output terminal;
- a capacitor having a third terminal and a fourth terminal, the third terminal being coupled to the sawtooth wave output terminal and the fourth terminal being grounded; and
- a transistor coupled between the sawtooth wave output terminal and a ground and having a control terminal.

24. A motor drive circuit that automatically sets a rotation frequency of a motor, the drive circuit comprising:
- a frequency generator for generating a rotation frequency setting signal in conjunction with an oscillator, the frequency generator comprising:
  - a resistor having a first terminal and a second terminal, the first terminal being connected to a supply voltage and the rotation frequency setting signal being output from the second terminal; and
  - a capacitor having a third terminal and a fourth terminal, the third terminal being connected to the second terminal, and the fourth terminal being grounded;
- a speed control device having a sense-signal input terminal, a rotation-frequency-setting-signal input terminal and a modulation signal output terminal, the rotation-frequency-setting-signal input terminal being coupled to the second terminal of the resistor, and simultaneously receiving a sense signal and the rotation frequency setting signal through the sense-signal input terminal and the rotation-frequency-setting-signal input terminal, respectively, to automatically set a rotation speed specification frequency for the motor;
- a drive device having a first power output terminal, a second power output terminal and a signal input terminal, wherein the first power output terminal and the second power output terminal are coupled to the motor coil, respectively, and the drive device includes a plurality of transistors to generate a power drive signal; and
- a drive timing controller coupled to the modulation signal output terminal of the speed control device and the signal input terminal, the drive timing controller utilizing a plurality of switch elements to generate a timing control signal so as control output timing of the power drive signal and prevent the short circuit of the driver device.

25. The motor drive circuit according to claim 24, wherein the speed control device comprises:
- a first comparator having the sense-signal input terminal, the rotation-frequency-setting-signal input terminal, a first output terminal and a second output terminal, the first comparator simultaneously receiving the sense signal and the rotation frequency setting signal through the sense-signal input terminal and the rotation-frequency-selling-signal input terminal, respectively, wherein the sense signal corresponds to a real rotation frequency of the motor, the rotation frequency setting signal corresponds to a standard rotation frequency of the motor, a sensor is utilized to obtain the sense signal, and the sensor is mounted inside or outside the motor;
- a level generator having a first input terminal, a second input terminal and a level output terminal, wherein the first input terminal and the second input terminal are coupled to the first output terminal and the second output terminal, respectively, and the level generator is used to generate a level signal;
- a sawtooth wave generator having a sawtooth wave output terminal for generating a sawtooth wave signal; and
- a second comparator having a first input terminal, a second input terminal and the modulation signal output terminal, wherein the first input terminal and the second input terminal are connected to the sawtooth wave output terminal and the level output terminal, respectively, and the second comparator simultaneously receives the sawtooth wave signal and the level signal, and modulates, in the pulse width modulation manner, the sawtooth wave signal on a basis of the level signal so as to form the pulse width modulation signal capable of modulating the duty ratio.

26. The motor drive circuit according to claim 25, wherein the first comparator is selected from a group consisting of an OR gate logic operator, a NOR gate logic operator, an AND gate logic operator, a NAND gate logic operator and any combinations of the logic operators.

27. The motor drive circuit according to claim 25, wherein the first comparator is a phase-locked loop (PLL) circuit.

28. The motor drive circuit according to claim 25, wherein the first comparator is a counter.

29. The motor drive circuit according to claim 25, wherein the sensor comprises a Hall sensor or magnetic resistor.

30. The motor drive circuit according to claim 25, wherein the level generator comprises:
- a first transistor having a first source, a first gate and a first drain, the first source being connected to a supply voltage and the first gate being connected to the first output terminal;
- a second transistor having a second source, a second gate an a second drain, the second source being connected to the first drain, the second drain being grounded, and the second gate being connected to the second output terminal;
- a resistor having a first terminal and a second terminal, the first terminal being connected to the first drain and the second terminal being the level output terminal to generate the level signal by utilizing the phase difference signal; and
- a capacitor having a first terminal and a second terminal, the first terminal being connected to the level output terminal and the second terminal being grounded.

31. The motor drive circuit according to claim 30, wherein the first transistor is one of a field effect transistor and a bi-polar junction transistor.

32. The motor drive circuit according to claim 30, wherein the second transistor is one of a field effect transistor and a bi-polar junction transistor.

33. The motor drive circuit according to claim 25, wherein the sawtooth wave generator comprises:
- a resistor having a first terminal and a second terminal, the first terminal being coupled to the supply voltage and the second terminal being connected to the sawtooth wave output terminal;
- a capacitor having a third terminal and a fourth terminal, the third terminal being coupled to the sawtooth wave output terminal and the fourth terminal being grounded; and
- a transistor coupled between the sawtooth wave output terminal and a ground and having a control terminal.

34. The motor drive circuit according to claim 24, wherein the motor includes a single coil, which has a first terminal and a second terminal, and the drive device comprises:

a first transistor having a first source, a first gate and a first drain, the first source being connected to a power supply end, the first drain being the first power output terminal and coupled to the first terminal of the single coil, and the first gate being connected to the drive timing controller;

a second transistor having a second source, a second gate and a second drain, the second source being coupled to a ground end, the second drain being the first power output terminal and coupled to the first terminal of the single coil, and the second gate being connected to the drive timing controller;

a third transistor having a third source, a third gate and a third drain, the third source being coupled to the ground end, the third drain being the second power output terminal and coupled to the second terminal of the single coil, and the third gate being connected to the drive timing controller, wherein the first transistor and the third transistor are turned on simultaneously to generate a first drive current; and a fourth transistor having a fourth source, a fourth gate and a fourth drain, the fourth source being connected to the power supply end VCC, the fourth drain being the second power output terminal and coupled to the second terminal of the single coil, and the fourth gate being connected to the drive timing controller, wherein the second transistor and the fourth transistor are turned on simultaneously to generate a second drive current, the first drive current and the second drive current are not generated simultaneously, and the first drive current and the second drive current correspond to rotation directions of the motor, respectively.

35. The motor drive circuit according to claim 24, wherein the motor includes a first coil and a second coil, each of which having a first terminal and a second terminal, the first terminals of the first coil and the second coil are simultaneously coupled to the power supply end, and the drive device comprises:

a first transistor having a first source, a first gate and a first drain, the first source being connected to the ground end, the first drain being the first power output terminal and coupled to the second terminal of the first coil, and the first gate being connected to the drive timing controller; and a second transistor having a second source, a second gate and a second drain, the second source being connected to the ground end, the second drain being the second power output terminal and coupled to the second terminal of the second coil, and the second gate being connected to the drive timing controller.

36. The motor drive circuit according to claim 24, further comprising:

a lock-up detection circuit connected to the drive timing controller, the lock-up detection circuit detecting a lock-up state of a rotor of the motor when an external force is applied to the rotor, wherein when the rotor is locked, the motor stops rotating to reduce power consumption;

a lock-up timing controller connected to the lock-up detection circuit, the lock-up timing controller modulating the lock-up detection circuit and intermittently starting the motor by adjusting the power drive signal; and a frequency processing device coupled to the sense-signal input terminal and the lock-up detection circuit, the frequency processing device receiving the sense signal and converting the frequency of the sense signal.

37. A method for automatically correcting a rotation frequency of a motor, comprising the steps of:

inputting a sense signal and a rotation speed signal, wherein the sense signal is generated from a sensor;

utilizing a speed control device to simultaneously receive the sense signal and the rotation speed signal in order to generate a phase difference signal, and to generate, in a pulse width modulation manner, a pulse width modulation signal capable of modulating a duty ratio, wherein the pulse width modulation signal corresponds to the phase difference signal between the sense signal and the rotation speed signal, the operating the speed control device comprising the steps of:

utilizing a first comparator to simultaneously receive the sense signal and the rotation speed signal to form the phase difference signal, wherein the sense signal corresponds to the real rotation frequency of the motor, the rotation speed signal corresponds to a standard rotation frequency of the motor, the sensor is mounted inside or outside the motor, and the first comparator is selected from a group consisting of an OR gate logic operator, a NOR gate logic operator, an AND gate logic operator, a NAND gate logic operator and any combinations of the logic operators;

utilizing a level generator to selectively receive and process the phase difference signal to generate a level signal;

utilizing a sawtooth wave generator to generate a sawtooth wave signal; and utilizing a second comparator to simultaneously receive the sawtooth wave signal and the level signal, and modulate, in the pulse width modulation manner, the sawtooth wave signal on a basis of the level signal so as to form the pulse width modulation signal capable of modulating the duty ratio;

utilizing a drive device to generate a power drive signal to automatically correct the rotation frequency of the motor, wherein a drive timing controller is used to receive the pulse width modulation signal and to generate a timing control signal to control output timing of the power drive signal so as to prevent the short circuit of the driver device; and immediately utilizing the sensor to detect a real rotation frequency of the motor, generate a correction sense signal, and immediately feed the correction sense signal back to the speed control device to form a closed loop control.

38. The method according to claim 37, wherein the first comparator is a counter.

39. The method according to claim 37, wherein the sensor comprises a Hall sensor or magnetic resistor.

40. A method for automatically setting a rotation frequency of a motor, comprising the steps of:

generating a rotation frequency setting signal from a frequency generator, and a sense signal by a sensor;

utilizing a speed control device to simultaneously receive the sense signal and the rotation frequency setting signal in order to generate a phase difference signal, and to generate, in a pulse width modulation manner, a pulse width modulation signal capable of modulating a duty ratio, wherein the pulse width modulation signal corresponds to the phase difference signal between the sense signal and the rotation frequency setting signal; and utilizing a drive device to generate a power drive signal to automatically set the rotation frequency of the motor, wherein a drive timing controller is used to receive the pulse width modulation signal and to generate a timing control signal to control output timing of the power drive signal so as to prevent the short circuit of the driver device;

wherein the frequency generator for generating the rotation frequency setting signal comprises:

a resistor having a first terminal and a second terminal, the first terminal being connected to the supply voltage, and the rotation frequency setting signal at being output from the second terminal; and a capacitor having a third terminal and a fourth terminal, the third terminal being connected to the second terminal and the fourth terminal being grounded.

41. The method according to claim 40, wherein the first comparator is selected from a group consisting of an OR gate logic operator, a NOR gate logic operator, an AND gate logic operator, a NAND gate logic operator an any combinations of the logic operators.

42. The method according to claim 40, wherein the first comparator is a phase-locked loop (PLL) circuit.

43. The method according to claim 40, wherein the first comparator is a counter.

44. The method according to claim 40, wherein the sensor comprises a Hall sensor or magnetic resistor.

* * * * *